United States Patent Office 3,024,123
Patented Mar. 6, 1962

3,024,123
PROCESS FOR PRODUCING SYNTHETIC ANHYDRITE
Helmuth Theilacker, Toronto, Ontario, Canada (R.R. 1, Ashburn, Ontario, Canada), and Roy Vincent Jackson, Wilmington, Del. (155 E. 44th St., New York, N.Y.)
No Drawing. Filed June 3, 1959, Ser. No. 817,719
4 Claims. (Cl. 106—109)

This invention relates to a process for producing synthetic anhydrite, and in particular to a process for producing synthetic anhydrite by the reaction of sulfuric acid with fluorspar.

It is well known that sulfuric acid reacts with fluorspar at elevated temperatures to produce hydrofluoric acid and calcium sulfate:

$$CaF_2 + H_2SO_4 = 2HF + CaSO_4$$

This reaction is used on a large scale for the commercial production of hydrofluoric acid. To obtain maximum yields of the latter, an excess of from 1% to 18% of sulfuric acid is used, and for continuous operation (as contrasted with batch operations, which are now obsolete) the excess must normally be at least 10% to make the process economically competitive.

The calcium sulfate produced (particularly that from the continuous process) therefore has a high acid content and presents difficult disposal problems, but it is possible to convert it by known processes into a valuable by-product, namely synthetic anhydrite, for which there is a substantial demand in the building industry. Thus synthetic anhydrite is commercially produced solely as a by-product, and the conventional processes for converting calcium sulfate waste into a usable binding material are hampered by problems connected with the neutralization of the high acid content that is dictated by the conditions favoring maximum yields of hydrofluoric acid in the conventional fluorspar reaction. The neutralization of the calcium sulfate is carried out by reacting it with a suitable base, but the process involves serious control difficulties arising out of the wide variations in acid content and by the need to avoid hydration of the anhydrite by contact with the water produced in the neutralization step.

Efforts have been made to reduce the necessity for an excess of sulfuric acid by providing means for thoroughly mixing the reactants prior to and during the exposure of the reactants to the reaction temperatures used in conventional reaction furnaces, as disclosed in U.S. Patent 1,150,415 of H. B. Bishop and Canadian Patent 561,979 of List et al. However, these known methods do not contemplate the activation of the calcium sulfate produced so as to provide a setting and binding building material, and therefore do not attempt to regulate either the fineness of the fluorspar nor the degree of acidity of the product in a manner that would enable the product to be used as such building material.

The fluorspar-acid reaction is conventionally run for a period of 30 to 60 minutes at a temperature between 200 and 250° C., using 96 to 98% sulfuric acid and finely ground acid-grade fluorspar that is made by a flotation process. Such fluorspar normally will have the following typical screen analysis: 1% on 100 mesh, 12% on 200 mesh, 30% on 250 mesh, 12% on 325 mesh, and 45% through 325 mesh. Grinding to a greater degree of fineness is not normally justified for conventional hydrofluoric acid production, because the yield increase that results is offset by the additional grinding cost and handling loss of fluorspar. Equivalent higher yields can be obtained more cheaply by using a 5 to 10% excess of sulfuric acid (which in the United States, for instance, is the cheaper of the two reactants) or an excess of fluorspar. This degree of fineness is less than that required for the synthetic anhydrite product of the neutralization of the calcium sulfate sludge produced by the acid-fluorspar reaction. The neutralized sludge is normally ground to the fineness required for synthetic anhydrite for use in the building industry, which is such that not more than 1% remains on 170 mesh. This involves extensive milling and grinding in suitable apparatus, such as hammer and/or ball mills.

The principal object of this invention is to provide a process for producing substantially neutral, finely-ground synthetic anhydrite that eliminates the aforesaid neutralization and subsequent sizing operations and therefore that reduces the cost of production of synthetic anhydrite without increasing the real cost of production of hydrofluoric acid.

A further object is to provide a process for producing finely-ground synthetic anhydrite in conjunction with hydrofluoric acid as a by-product.

These objects are achieved according to the invention by the steps of first grinding the fluorspar to the fineness required for synthetic anhydrite used in the building industry and then reacting it with substantially its molar equivalent of sulfuric acid at an elevated temperature whereby no substantial excess of sulfuric acid is left in the calcium sulfate produced. Preferably the fluorspar is ground to approximately 170 mesh size or finer before the reaction, and the reaction may be carried out at a temperature of from 150 to 200° C., which is below or at the lower end of the above-noted conventional range of temperatures used in the producing of hydrofluoric acid by conventional application of the sulfuric acid-fluorspar reaction. If the process is carried out continuously, as is preferred, it is advisable to arrange the apparatus so that the acid and fluorspar are mixed at one location and part of the hydrofluoric acid is driven off and collected, and the reaction mixture is continuously conveyed through a chamber that is gas-sealed from the said location where the remainder of hydrofluoric acid is driven off and collected.

The yield of hydrofluoric acid is comparable with that produced by the conventional process, because the reaction according to the invention tends to go to completion without the conventional excess of sulfuric acid as a result of the fineness of the ground fluorspar used in the reaction. The hydrofluoric acid may be collected as a by-product by conventional means. In referring to the use of substantially molar equivalent amounts of sulfuric acid and fluorspar in the reaction, it is not intended to eliminate the possibility of making minor adjustments in the proportion of sulfuric acid in order to compensate for small amounts carried off with the hydrogen fluoride gas or to produce corresponding minor variations in the pH of the product on the acid side of neutrality, for applications where a slight degree of acidity may be advantageous, nor would it be outside the scope of the invention to add small quantities of neutralizing material to the calcium sulfate product where, by accident or design, a small excess, say 1 to 3%, of sulfuric acid was used in the reaction.

The substantially neutral calcium sulfate product, which is already ground to the fineness required, is finally activated by the addition of small quantities of suitable known materials such as alkali sulfates, lime or portland cement, for subsequent use as a binder in the building industry. For instance, according to the invention up to about 3% of potassium sulfate or of calcium hydroxide may be thoroughly mixed in the dry form with the calcium sulfate product of the reaction.

The activated product may then be mixed with water, for instance in the proportion of from 18 to 35%, and/or with sand or other inorganic material or mineralized organic material, for use as a plaster, mortar or cement, according to conventional procedures.

An example of the manner of carrying out the process according to the invention is as follows: Commercial acid-grade fluorspar having the typical mesh analysis previously mentioned and containing 97.5 to 98% $CaF_2$ is ground until less than 1% remains on a 170 mesh screen and is charged by an axial screw conveyor into a rotating horizontal steel cylindrical vessel of conventional design having a hollow shaft. 96% sulfuric acid is added continuously, at a rate providing molar equivalence with the fluorspar, through the conveyor shaft and the mixture is heated to 195 to 200° C. The hydrogen fluoride leaves the reaction mixture through a steel pipe at the top of a conventional hood at the end of the reactor from where it is collected in conventional condensing apparatus. The residue is conveyed through a second similar vessel gas-sealed from the first before the charge of calcium sulfate is conveyed to the storage silo. The product is activated before reaching the silo by mixing 3% slaked lime into the stream of dried product. The yield of calcium sulfate (before activation) is approximately 98% and a similar yield of hydrogen fluoride is achieved.

It will be apparent that many widely different embodiments of this invention may be made without departing from the spirit and scope thereof; therefore, it is not intended to be limited except as indicated in the appended claims.

We claim:

1. A process for producing from fluorspar substantially neutral, finely-ground setting and binding building material composed of synthetic anhydrite, with hydrofluoric acid as a by-product, comprising grinding the fluorspar to a fineness such that not more than about 1% remains on a 170 mesh screen, and reacting it with substantially its molar equivalent of concentrated sulfuric acid at a temperature between about 150° C. and about 250° C. whereby no substantial excess of sulfuric acid is left in the residue, the hydrogen fluoride produced being driven off from the calcium sulfate product and mixed with water to form hydrofluoric acid, and adding to the calcium sulfate residue an activating material that will give the said residue the property of setting when water is added to it.

2. A process as claimed in claim 1 in which the acid and fluorspar are continuously mixed at one location and part of the hydrogen fluoride produced is driven off and collected, and the reaction mixture is continuously conveyed through a chamber that is gas-sealed from the said location where the remainder of the hydrogen fluoride is driven off and collected.

3. A process as claimed in claim 1 in which the reaction temperature is between 150 and 200° C.

4. A process as claimed in claim 3 in which the reaction temperature is about 200° C.

References Cited in the file of this patent

UNITED STATES PATENTS

| | | |
|---|---|---|
| 1,150,415 | Bishop | Aug. 17, 1915 |
| 2,574,507 | Weber | Nov. 13, 1951 |
| 2,959,466 | Reimers | Nov. 8, 1960 |

FOREIGN PATENTS

| | | |
|---|---|---|
| 561,979 | Canada | Aug. 19, 1958 |